United States Patent
Shen et al.

(10) Patent No.: US 11,797,789 B2
(45) Date of Patent: Oct. 24, 2023

(54) RFID TERMINAL AND METHOD OF USING THE SAME

(71) Applicant: SHENZHEN IDATA TECHNOLOGY COMPANY LTD., Guangdong (CN)

(72) Inventors: Shian Shen, Shenzhen (CN); Dongsheng Wang, Shenzhen (CN); Wei Zhao, Shenzhen (CN); Chao He, Shenzhen (CN)

(73) Assignee: SHENZHEN IDATA TECHNOLOGY COMPANY LTD., Guangdong (CN)

( * ) Notice: Subject to any disclaimer, the term of this patent is extended or adjusted under 35 U.S.C. 154(b) by 344 days.

(21) Appl. No.: 17/263,763

(22) PCT Filed: Sep. 30, 2020

(86) PCT No.: PCT/CN2020/119402
§ 371 (c)(1),
(2) Date: Jan. 27, 2021

(87) PCT Pub. No.: WO2021/068842
PCT Pub. Date: Apr. 15, 2021

(65) Prior Publication Data
US 2022/0335233 A1    Oct. 20, 2022

(30) Foreign Application Priority Data

Oct. 10, 2019   (CN) .................... 201910960055.X
Oct. 10, 2019   (CN) .................... 201910960569.5

(51) Int. Cl.
*G06K 7/10*   (2006.01)
(52) U.S. Cl.
CPC .............................. *G06K 7/10316* (2013.01)

(58) Field of Classification Search
CPC ........... G06K 7/10316; G06K 7/10198; G06K 7/10346; G06K 7/10386; G06K 7/10118; G06V 10/235; G06V 10/44
See application file for complete search history.

(56) References Cited

U.S. PATENT DOCUMENTS

2009/0284606 A1\* 11/2009 Takanezawa .... G08B 13/19673
348/207.1
2011/0025458 A1   2/2011 Rokhsaz et al.
(Continued)

FOREIGN PATENT DOCUMENTS

CN   105528626 A   4/2016
CN   108881809 A   11/2018
(Continued)

OTHER PUBLICATIONS

PCT/ISN/210 International Search Report dated Jan. 4, 2021 issued in Parent Application No. PCT/CN2020/119402 (5 pages).
(Continued)

*Primary Examiner* — Tuyen K Vo
(74) *Attorney, Agent, or Firm* — Polsinelli PC

(57) ABSTRACT

The present disclosure provides a RFID terminal and a method of using the same. The RFID terminal includes: a directional antenna module configured to directionally receive a signal transmitted by an electronic tag on an item in a region to be read; a camera configured to collect an image of the region to be read; and a control unit configured to screen information of a target item according to the image of the region to be read captured by the camera.

13 Claims, 4 Drawing Sheets

(56) References Cited

U.S. PATENT DOCUMENTS

| | | | | |
|---|---|---|---|---|
| 2015/0269398 | A1* | 9/2015 | Zumsteg | G06K 7/10099 |
| | | | | 235/440 |
| 2018/0075270 | A1* | 3/2018 | Meguro | G06K 7/10881 |
| 2019/0286683 | A1* | 9/2019 | Kittur | G06F 16/9577 |
| 2019/0328265 | A1* | 10/2019 | Zho | A61B 5/055 |
| 2019/0354735 | A1* | 11/2019 | Madhusudhana | G06V 10/255 |

FOREIGN PATENT DOCUMENTS

| | | |
|---|---|---|
| CN | 109784385 A | 5/2019 |
| CN | 110766109 A | 2/2020 |
| CN | 110826659 A | 2/2020 |

OTHER PUBLICATIONS

PCT/ISA/220 Notification of Transmittal of the International Search Report and Written Opinion of the International Searching Authority, or the Declaration issued in Parent Application No. PCT/CN2020/119402 (1 page).

PCT/ISA/237 Written Opinion of the International Searching Authority dated Jan. 4, 2021 issued in Parent Application No. PCT/CN2020/119402 (4 pages).

* cited by examiner

RFID TERMINAL AND METHOD OF USING THE SAME

CROSS REFERENCES TO RELATED APPLICATION

This application is a National Stage of International Application No. PCT/CN2020/119402 filed on Sep. 30, 2020 which claims priority to Chinese patent application Nos. 201910960569.5 and 201910960055.X, both filed on Oct. 10, 2019 and entitled "RFID TERMINAL AND METHOD OF USING THE SAME", the contents of which are hereby incorporated by reference in their entireties.

TECHNICAL FIELD

The present disclosure relates to RFID terminals for screening information by an image identification technology and methods of using the same.

BACKGROUND

The radio frequency identification (RFID), as a kind of automatic identification technology, carries out a non-contact and bidirectional data communication in a radio frequency manner, and reads and writes recording media (such as an electronic tag, a radio frequency card, or the like) in the radio frequency manner, so as to achieve the purpose of identification target and data exchange. An overall RFID system is mainly composed of a reader, an electronic tag, and a data management system. The operational principle of the RFID system is that the reader transmits radio wave energy having a certain frequency to drive a circuit to read out internal data, and then the reader receives and parses the data in sequence and sends the data to the data management system for processing correspondingly. The RFID technology relies on the electromagnetic wave, and does not need to a physical contact. A RFID reader having a high frequency band can even identify and read contents of a plurality of tags in concurrency, such that the RFID technology has been more and more widely used.

SUMMARY

An objective of the present disclosure is to provide an RFID terminal for screening information by an image identification technology and a method of using the RFID terminal.

In order to achieve the above objective, the present disclosure includes following technical means:

The present disclosure provides a RFID terminal, which includes:

a directional antenna module configured to directionally receive a signal transmitted by an electronic tag on an item in a region to be read;

a camera configured to collect an image of the region to be read; and a control unit configured to screen information of a target item according to the image of the region to be read captured by the camera.

The present disclosure also provides a method of using a RFID terminal, and the method includes:

capturing, by a camera, an image of a region to be read;
receiving, by a directional antenna module, a signal transmitted by an electronic tag in the region to be read; and
comparing, by a control unit, the image captured by the camera with an image in an image library stored in a storage unit via a deep learning neural network to identify a target item, and screening, by the control unit, information, in the signal received by the directional antenna module, of the target item.

The present disclosure also provides a method of using a RFID terminal, and the method includes:

capturing, by a camera, an image of a region to be read, and displaying, by a display screen, the image of the region to be read;
receiving, by a directional antenna module, a signal transmitted by an electronic tag in the region to be read;
manually selecting an item in the image on the display screen; and
screening information of the selected item.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

The following drawings of the present disclosure are used herein as part of the present disclosure to understand the present disclosure. Embodiments of the present disclosure and description thereof are illustrated in the accompanying drawings to explain the principle of the present disclosure.

Figure 1:
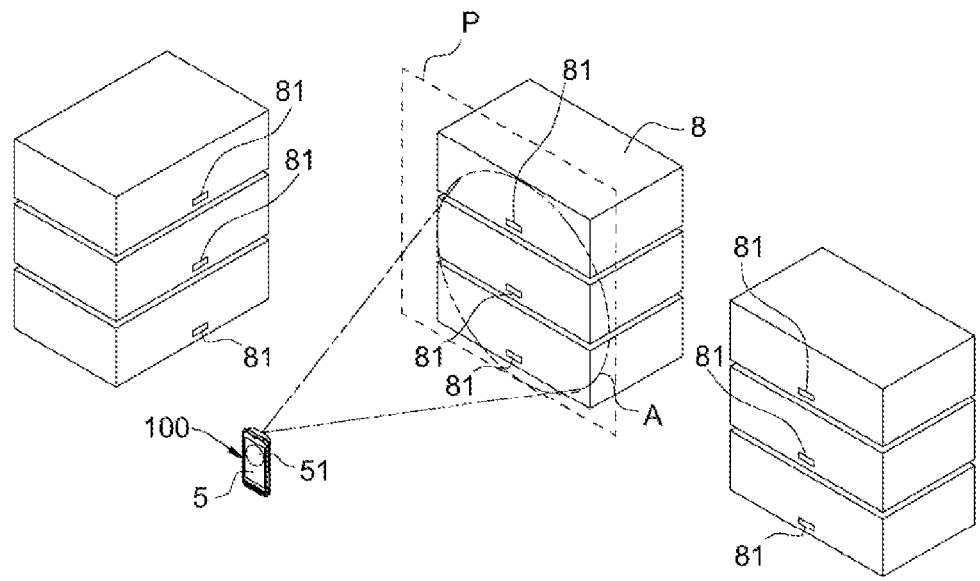
FIG. 1 is a schematic view of RFID terminal reading item information in an embodiment of the present disclosure, in which a reception range of a directional antenna module is shown by dashed lines.

The embodiments include the following reference numerals:

100. RFID terminal; 1. directional antenna; X. maximum radiation direction; A (A'). reception range; 2. camera; 3. trigger key; 4. control unit; 5. display screen; 51. display region; 6. storage unit; L. optical axis; P'. region to be read; 7. button; 8. item to be identified; 81. electronic tag.

DETAILED DESCRIPTION OF THE EMBODIMENTS

Since the electromagnetic wave used for the RFID is invisible, the operation of the reader is arbitrary when identifying and reading the tags, and a user does not know which position of the tag is read. In an actual use process, for example when inventorying goods, a good located at next region may be inventoried accidentally since different goods are located at different regions which are usually relatively close, thereby resulting in the user mistakenly considers that the good is located at a wrong region, and needs to inventory again. If it goes on, the user cannot quickly confirm whether there is a good located at wrong place indeed, thereby wasting the time and reducing the efficiency.

In view of the above-mentioned problems, it is necessary to provide a RFID terminal and a method of using the same, by which the problems can be solved.

In order to make objectives, structures, features and advantages of the present disclosure more apparent, specific embodiments of the present disclosure will be described in detail with reference to the accompanying drawings.

Figure 2:
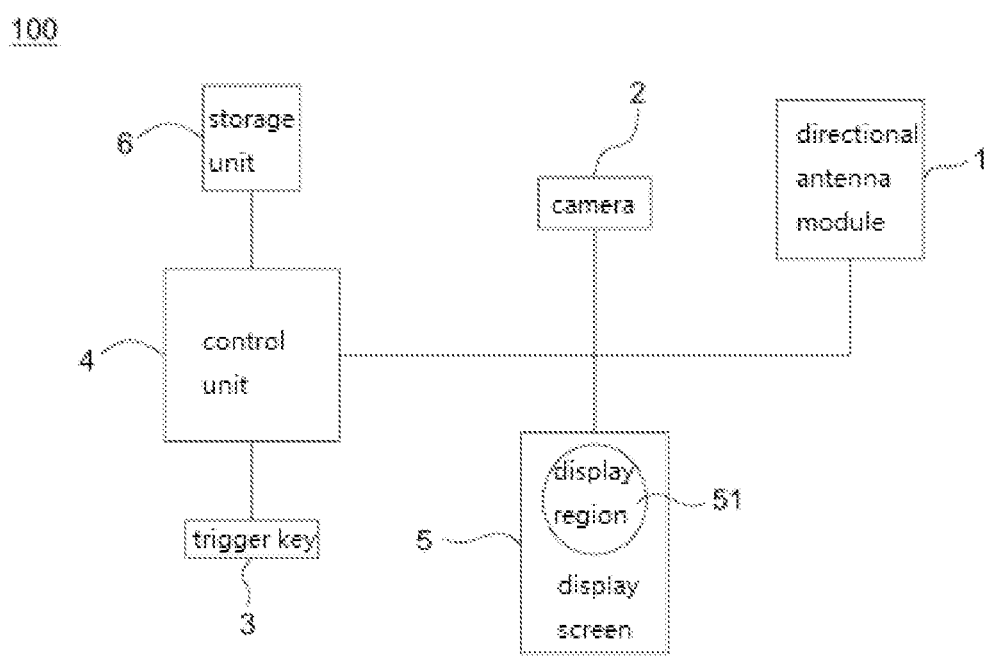
FIG. 2 is a block view of the RFID terminal in FIG. 1.

As shown in FIGS. 1 and 2, in an embodiment of the present disclosure, a radio frequency identification (RFID) terminal 100 is provided, which includes a directional antenna module 1, a camera 2, a display screen 5, and a control unit 4.

Figure 3:
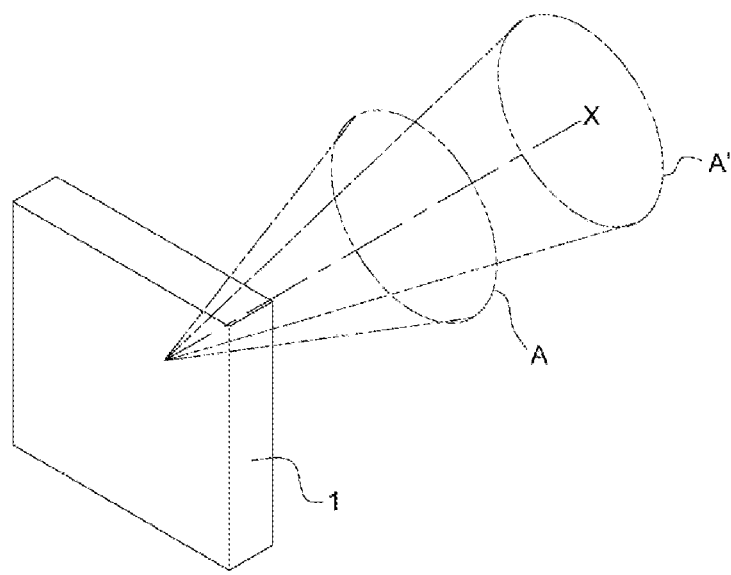
FIG. 3 is a schematic view of the directional antenna module receiving a signal in various reception ranges in an embodiment of the present disclosure.

As shown in FIG. 3, the directional antenna module 1 is designed to receive a signal in various reception ranges A (A'). The various reception ranges A (A') are precisely determined to have known shapes, and the shapes thereof can be adjusted to regular shapes, such as circular shapes or elliptical shapes, by certain technical means as desired. The directional antenna module 1 can be an array antenna, a combination antenna or the like, and have an adjustable radiation angle or an adjustable maximum radiation direction X, so that the reception range A (A') of the directional antenna module 1 can be adjusted as desired. Optionally, the directional antenna module 1 is a phased array antenna to achieve a precise control of the radiation angle and the maximum radiation direction X of the directional antenna module 1, thereby achieving a precise control of the reception range A (A') of the directional antenna module 1. In the present embodiment, the directional antenna module 1 is both a transmission antenna and a reception antenna. On the basis of the reciprocity theorem of antennas, the radiation range when the directional antenna module 1 is the transmission antenna is the same as the reception range A (A') when the directional antenna module 1 is the reception antenna. In another embodiment, the directional antenna module 1 can only be a reception antenna, so that a transmission antenna can be additionally provided.

Figure 4:
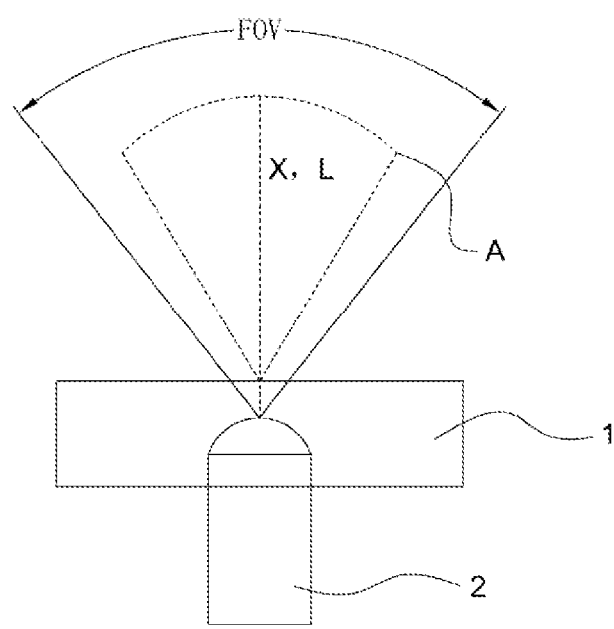
FIG. 4 is a schematic view of a field of view of the camera and the reception range of the directional antenna of the RFID terminal in an embodiment of the present disclosure.

As shown in FIGS. 3 and 4, the camera 2 is configured to capture an image of a region to be read P. An optical axis L of the camera 2 is arranged coaxially or parallel to the maximum radiation direction X (or a maximum reception direction) of the directional antenna module 1. The reception range A (A') of the directional antenna module 1 is located within a field of view (FOV) of the camera 2, such that an item 8 readable by the directional antenna module 1 is located within the FOV of the camera 2. In other embodiments (not shown), an included angle can be formed between the optical axis L of the camera 2 and the maximum radiation direction X of the directional antenna module 1.

Figure 5:
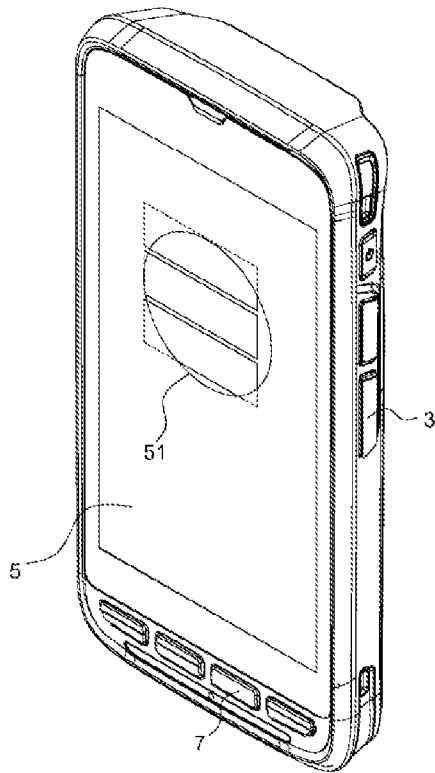
FIG. 5 is an enlarged view of the RFID terminal in FIG. 1, in which an item to be identified is displayed by a display box.

As shown in FIGS. 1 and 5, the display screen 5 is a touch screen. The display screen 5 is provided with a display region 51 thereon. The display region 51 is shown on the display screen 5 by solid lines, thereby forming a display frame. The image of the region to be read P captured by the camera 2 is displayed on the display screen 5. The shape of the display region 51 is artificially set, such that the display range of the display region 51 is substantially coincides with the reception range A (A') of the directional antenna module 1. Since the reception range A (A') is adjustable, the display region 51 is set to vary with the variation of the reception range A (A'), such that the display region 51 is always substantially coincides with the reception range A (A'). Since the display region 51 visually displays the reception range A (A') which is not visible before, a user can recognize an identification and reading range of the RFID terminal 100. The user can operate the display screen 5 to select a target item 8 in the image.

In particular, the RFID terminal 100 can establish an image library for multiple items to be identified 8 by a deep learning neural network and store the image library in a storage unit 6 for invoking by the control unit 4. When the camera 2 captures the image of the region to be read P and displays it on the display screen 5, and when the user selects an item 8 in the image, for example selects certain item 8 in the image by clicking or a marquee manner, the control unit 4 compares the image of the item 8 selected by the user with an image in the image library stored in the storage unit 6 by the deep learning neural network, to identify the item 8 selected by the user. Then, the control unit 4 displays information, in the signal received by the directional antenna module 1, of all items, which have the same kind as the item 8 selected by the user, on the display screen 5. In the present embodiment, for the item 8 in the image, a contour thereof can be automatically outlined by an image recognition algorithm. This process is like the face recognition process when a smartphone takes a picture, that is, when a camera of the smartphone discriminates a face, the smartphone automatically generates a box to track the face. Similarly, in the present embodiment, after the camera 2 captures the image of the item 8, the control unit 4 automatically outlines the contour of the item 8 by the image recognition algorithm. The user can conveniently click (or select by the marquee manner, etc.) the contour region corresponding to the item 8 to select the item 8. Alternatively, when the user clicks an item 8, an algorithm can automatically identify the item 8 clicked by the user, and automatically select all items, which have the same kind as the item 8 clicked by the user, in the image, which is more intelligent.

Referring to FIG. 2 again, the control unit 4 is triggered by a trigger key 3 and/or a button 7 to control the camera 2 to capture the image and control the directional antenna module 1 to transmit or receive the signal.

In an embodiment (not shown), the user can manually perform an operation on the display screen 5 to select an image of the item 8, which corresponds to the item 8 of a corresponding region within the region to be read P, within a region by the marquee manner. Further, the control unit 4 adjusts the reception range A (A') of the directional antenna module 1 according to the range of the item 8 selected by the user, such that the region coincides with the reception range, and the directional antenna module 1 reads only the item 8 selected by the user, or the directional antenna module 1 reads only another item other than the item 8 selected by the user on the display screen 5. After that, the display screen 5 further displays information of item 8 selected by the user, or displays information of another item other than the item 8 selected by the user.

In another embodiment (not shown), the user can operate the display screen 5 to select a first region and a second region in the image, respectively. The RFID terminal 100 further reads the information of the item 8 in an intersection set region, a union set region, or a complementary set region between the first region and the second region according to a preset manner. The intersection set region refers to a region where the first region intersects (overlaps) with the second region. The union set refers to a region where the first region and the second region are merged. The complementary set region refers to a region of the first region from which the second region is removed or a region of the second region from which the first region is removed. The situation that which specific region of the intersection set region, union set region, and the complementary set region is read can be preset as desired. Of course, another region other than the intersection set region, the union set region, and the complementary set region can also be read by a preset manner. The control unit 4 further adjusts the reception range A (A') of the directional antenna module 1 to read the information of item 8 in the corresponding region. After that, the display screen 5 displays the read information of item 8.

In another embodiment (not shown), the directional antenna module 1 reads information of all of items 8 displayed on the display screen 5 in advance. When the user selects a target item 8 by the manners in previous embodiments, the control unit 4 screens the information of the corresponding item 8 received by the directional antenna module 1 according to the target item 8 selected by the user, and further displays the information of the corresponding item 8 on the display screen 5. Alternatively, the directional antenna module 1 reads the information of all of items 8 displayed on the display screen 5 in advance, the control unit 4 further displays the information of all of items 8 on the display screen 5 in categories for the user to select. After the user clicks or selects a certain a type or types of items 8, the control unit 4 further displays the information of the item 8 selected by the user on the display screen 5.

In another embodiment (not shown), the user does not need to manually select the target item 8, that is, after the camera 2 captures the image of the region to be read P, the RFID terminal 100 automatically discriminates an identifiable item 8 in the image, excludes an unidentifiable item 8, and further screens information of the identifiable item 8. In the present embodiment, the RFID terminal 100 is capable of inventorying one or more types of specific items 8 in a mass of types of items, while excluding other types of items 8. The user does not need to operate to select the item 8 on the display screen 5, which is more convenient. Even the RFID terminal 100 may not provide with the display screen 5, but transmit the information of the identified item 8 to a remote device (not shown) for displaying.

Figure 7:
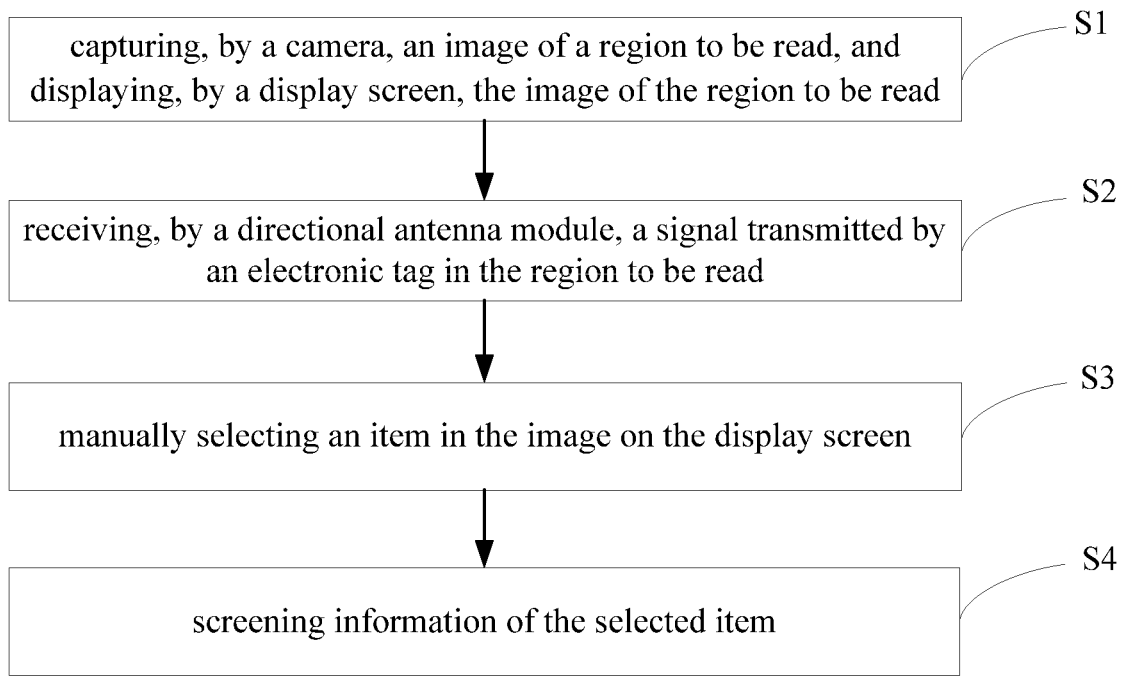
FIG. 7 is a flowchart of a method of using the RFID terminal in an embodiment of the present disclosure.

As shown in FIG. 7, in an embodiment of the present disclosure, a flowchart of a method of using the RFID terminal 100 is provided. The method includes following steps.

S1: capturing, by the camera 2, an image of a region to be read P, and displaying, by the display screen 5, the image of the region to be read P.

The display screen 5 is provided with a display region 51 thereon. The display region 51 is shown on the display screen 5 by solid lines, thereby forming a display frame. The image of the region to be read P captured by the camera 2 is displayed on the display screen 5. The shape of the display region 51 is artificially set, such that the display range of the display region 51 is substantially coincides with the reception range A (A') of the directional antenna module 1.

S2: receiving, by the directional antenna module 1, a signal transmitted by an electronic tag 81 in the region to be read P.

S3: manually selecting an item 8 in the image on the display screen 5.

There are various manners for manually selecting the item 8 in the image on the display screen 5. In the present embodiment, the various manners can include: selecting certain item 8 in the image by clicking or a marquee manner. For the item 8 in the image, a contour of the item 8 can be automatically outlined by an image recognition algorithm. This process is like the face recognition process when a smartphone takes a picture, that is, when a camera of the smartphone discriminates a face, the smartphone automatically generates a box to track the face. Similarly, in the present embodiment, after the camera 2 captures the image of the item 8, the control unit 4 automatically outlines the contour of the item 8 by the image recognition algorithm. The user can conveniently click (or select by the marquee manner, etc.) the contour region corresponding to the item 8 to select the item 8. Alternatively, when the user clicks (or selects by the marquee manner, etc.) an item 8, an algorithm can automatically identify the item 8 clicked (or selected by the marquee manner, etc.) by the user, and automatically select all items, which have the same kind as the item 8 clicked by the user, in the image, which is more intelligent.

Other manners for manually selecting the item 8 can also refer to the method of selecting the item 8 by user in the above-mentioned embodiments.

S4: screening information of the selected item 8.

The screening information of the selected item 8 can include: the control unit 4 firstly compares the image of the item 8 selected by the user with an image in an image library stored in the storage unit 6 via a deep learning neural network, to identify the item 8 selected by the user. In particular, the RFID terminal 100 can establish the image library for multiple items to be identified 8 by the deep learning neural network and store the image library in the storage unit 6 for invoking by the control unit 4.

Secondly, the control unit 4 selects information of all items 8, which have the same kind as the item 8 selected by the user, from information of all electronic tags 81 received by the directional antenna module 1 according to distinguishing features of the information of the electronic tags 81 on different items 8.

After S4, the control unit 4 further displays the information of the item 8 selected by the user on the display screen 5.

Figure 6:
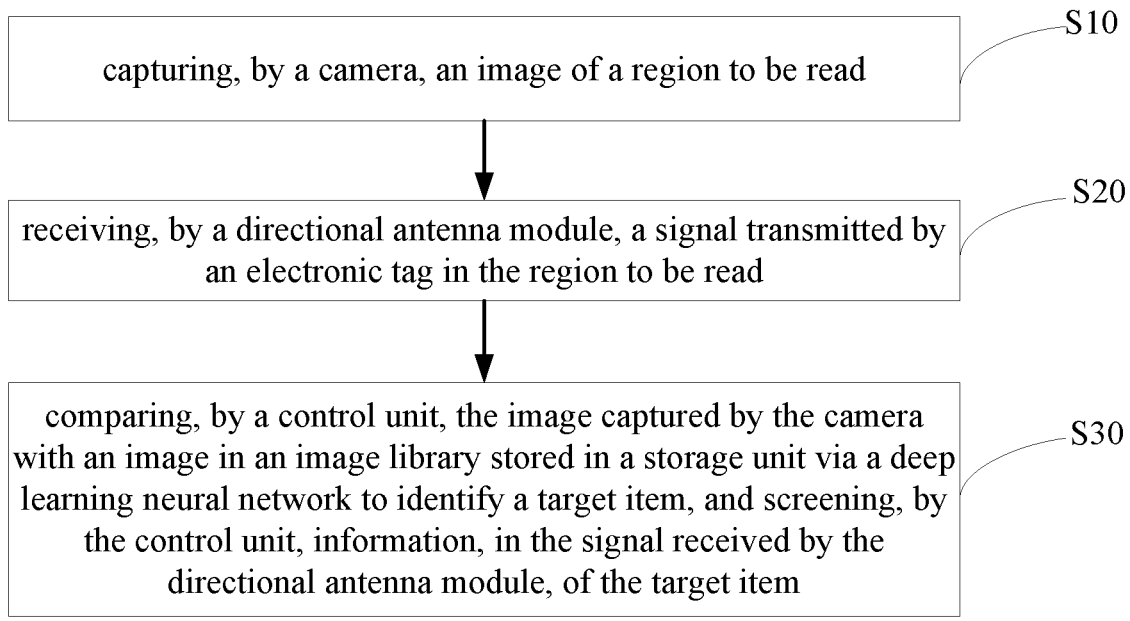
FIG. 6 is a flowchart of a method of using the RFID terminal in an embodiment of the present disclosure.

As shown in FIG. 6, in another embodiment of the present disclosure, a flowchart of a method of using the RFID terminal 100 is provided. The method includes following steps.

The S10: capturing, by the camera 2, an image of a region to be read P.

The S20: receiving, by the directional antenna module 1, a signal transmitted by an electronic tag 81 in the region to be read P.

The S30: comparing, by the control unit 4, the image captured by the camera 2 with an image in an image library stored in the storage unit 6 via a deep learning neural network, to identify a target item 8, and further screening, by the control unit 4, information, in the signal received by the directional antenna module 1, of the target item 8.

For the method of using the RFID terminal 100 in the present embodiment, the user does not need to manually select the target item 8, that is, after the camera 2 captures the image of region to be read P, the RFID terminal 100 automatically discriminates an identifiable item 8 in the image, excludes an unidentifiable item 8, and further screens information of the identifiable item 8. In the present embodiment, the RFID terminal 100 is capable of inventorying one or more types of specific items 8 in a mass of types of items, while excluding other types of items 8. The user does not need to operate to select the item 8 on the display screen 5, which is more convenient. Even the RFID terminal 100 may not provide with the display screen 5, but transmit the information of the identified item 8 to a remote device (not shown) for displaying.

Figure 8:
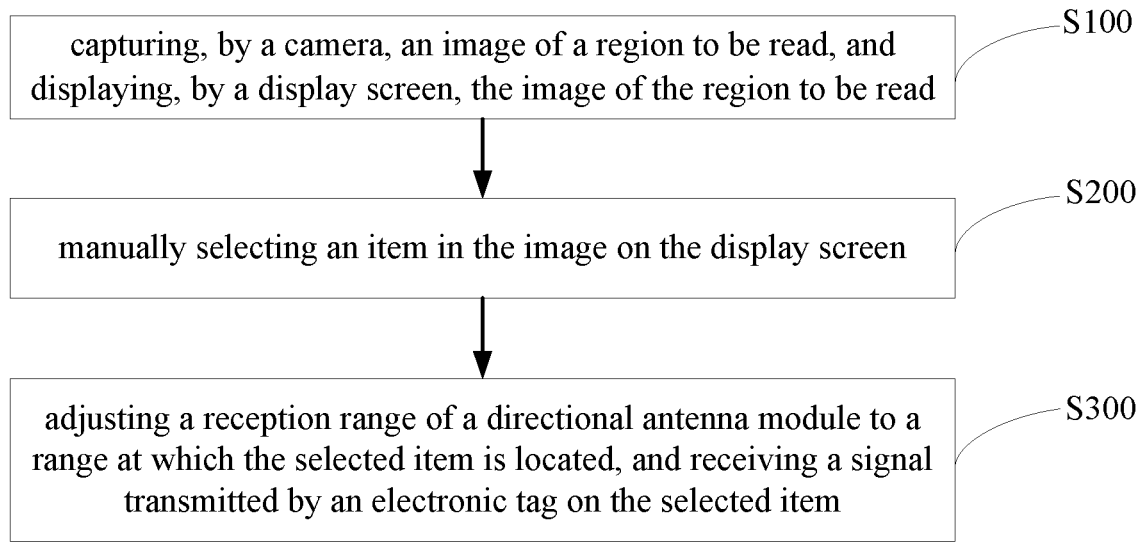
FIG. 8 is a flowchart of a method of using the RFID terminal in an embodiment of the present disclosure.

As shown in FIG. 8, in the present disclosure, a flowchart of a method of using the RFID terminal 100 is provided. The method includes following steps.

S100: capturing, by the camera 2, an image of a region to be read P, and displaying, by the display screen 5, the image of the region to be read P.

The display range of the display region 51 is substantially coincides with the reception range A (A') of the directional antenna module 1.

S200: manually selecting an item 8 in the image on the display screen 5.

The manually selecting the item 8 in the image on the display screen 5 includes: selecting a first region and a second region in the image, respectively, and reading information of the item 8 in an intersection set region, an union set region, or a complementary set region between the first region and the second region according to a preset manner. The specific operation manners can refer to the above-mentioned embodiments. Other manners of manually selecting the item 8 can also refer to the manners of selecting the item 8 by user in other above-mentioned embodiments.

S300: adjusting the reception range A (A') of the directional antenna module 1 to a range at which the selected item 8 is located, and receiving a signal transmitted by the electronic tag 81 on the selected item 8.

After S300, the control unit 4 processes the received information of the electronic tag 81 and further displays it on the display screen 5.

The RFID terminal and the method of using the RFID terminal of the present disclosure have the following advantages:

1. In the RFID terminal 100 of the present disclosure, the image of the region to be read P is captured by the camera 2; the image captured by the camera 2 is compared with the image in the image library stored in the storage unit 6 by the control unit 4 via the deep learning neural network, to identify the target item 8; and the information of the target item 8 in the signal received by the directional antenna module 1 is further screened. The target item 8 in the image is automatically identified via the deep learning neural network, and the information of the target item 8 is further screened, which is more intelligent, improves the efficiency and enhances the user experience.

2. In the RFID terminal 100 of the present disclosure, the directional antenna module 1 is configured to directionally receive the signal transmitted by the electronic tag 81 on the item 8 in the region to be read P; the camera 2 is configured to capture the image of the region to be read P; the display screen 5 is configured to display the image of the region to be read P, and for a user's operation to select the item 8 in the image; The control unit 4 is configured to screen the information of the item 8 selected by the user according to the user's operation. The user can select the target item 8 in the image on the display screen 5, and the control unit 4 can further screen the information of the item 8 selected by the user, such that the RFID process, which is not visible before, becomes visible, and the RFID process, which is arbitrary before, becomes purposeful.

3. The directional antenna module 1 is provided with a reception range A (A'), and the display screen 5 is provided with a display region 51. The range of the display region 51 is substantially coincides with the reception range A (A'). Since the display region 51 visually displays the reception range A (A') which is not visible before, the user can recognize an identification and reading range of the RFID terminal 100.

The above detailed description is merely a description of the preferred embodiments of the present disclosure, and is not intended to limit the scope of protection of the present disclosure. Therefore, any equivalent technical changes made by using the specification and drawings of the present disclosure are involved in the scope of protection of the present disclosure.

What is claimed is:

1. A radio frequency identification (RFID) terminal, comprising:
    a directional antenna configured to directionally receive a signal transmitted by an electronic tag on an item in a region to be read;
    a camera configured to collect an image of the region to be read; and
    a controller configured to screen information of a target item according to the image of the region to be read captured by the camera; and
    a display screen configured to display the image of the region to be read, and configured for a user's operation to select a first region and a second region in the image, respectively, wherein the RFID terminal further reads information of the item in an intersection set region, an union set region, or a complementary set region between the first region and the second region according to a preset manner.

2. The RFID terminal according to claim 1, wherein the screening, by the controller, the information of the target item comprises:
    the controller compares the image captured by the camera with an image in an image library in a memory via a deep learning neural network to identify the target item, and screens the information of the target item in the signal received by the directional antenna.

3. The RFID terminal according to claim 2, wherein the controller is further configured to adjust a reception range of the directional antenna according to a display range of the item selected by a user, to read information of the item selected by the user or to read information of other items from which the item selected by user is excluded.

4. The RFID terminal according to claim 1, wherein the directional antenna module is provided with a reception range; the display screen is provided with a display region; and a display range of the display region substantially coincides with the reception range.

5. The RFID terminal according to claim 1, wherein the controller is further configured to display the item in the region to be read on the display screen in categories, for a user to select the target item.

6. The RFID terminal according to claim 5, wherein the display screen is further configured to display information of the item selected by the user or to display information of other items from which the item selected by user is excluded.

7. The RFID terminal according to claim 1,
    wherein the display screen is configured for the user's operation to select the target item; and
    the controller is configured to screen information of items, which have the same kind as the item selected by a user, according to the user's operation.

8. The RFID terminal according to claim 1, wherein a reception range of the directional antenna is located within a field of view of the camera.

9. A method of using a RFID terminal, comprising:
    capturing, by a camera, an image of a region to be read;
    receiving, by a directional antenna, a signal transmitted by an electronic tag in the region to be read;

comparing, by a controller, the image captured by the camera with an image in an image library stored in a memory via a deep learning neural network to identify a target item, and screening, by the controller, information, in the signal received by the directional antenna of the target item;

displaying, by a display screen, the image of the region to be read;

selecting, by a user's operation, a first region and a second region in the image, respectively; and reading, by the RFID terminal, information of the item in an intersection set region, an union set region, or a complementary set region between the first region and the second region according to a preset manner.

10. A method of using a RFID terminal, comprising:

capturing, by a camera, an image of a region to be read, and displaying, by a display screen, the image of the region to be read;

receiving, by a directional antenna a signal transmitted by an electronic tag in the region to be read;

manually selecting an item in the image on the display screen; and screening information of the selected item;

wherein the manually selecting the item in the image on the display screen comprises:

selecting a first region and a second region in the image, respectively; and reading information of the item in an intersection set region, an union set region, or a complementary set region between the first region and the second region according to a preset manner.

11. The method according to claim 10, wherein the directional antenna is provided with a reception range; the display screen is provided with a display region; and a display range of the display region substantially coincides with the reception range.

12. The method according to claim 10, wherein the screening information of the selected item comprises: comparing, by a controller, the image selected by a user with an image in an image library stored in a memory via a deep learning neural network to identify the item selected by the user.

13. The method according to claim 10, the screening information of the selected item further comprising: adjusting a reception range of the directional antenna to a range at which the selected item is located, and receiving the signal transmitted by the electronic tag on the selected item.

* * * * *